United States Patent [19]
Harris et al.

[11] Patent Number: 4,460,531
[45] Date of Patent: Jul. 17, 1984

[54] COMPOSITE FIBER REINFORCED PROPELLER

[75] Inventors: Charles E. Harris; Donnie T. Toombs, Jr., both of Wichita, Kans.

[73] Assignee: The Boeing Company, Seattle, Wash.

[21] Appl. No.: 376,310

[22] Filed: May 10, 1982

[51] Int. Cl.³ .................. B29C 6/02; B29D 3/02; B29F 1/10
[52] U.S. Cl. .................. 264/138; 156/173; 156/245; 264/258; 264/271.1
[58] Field of Search ........... 264/258, 137, 138, 271.1, 264/279; 29/156.8 CF; 428/107, 108, 113, 114, 293; 156/245, 172, 173

[56] References Cited
U.S. PATENT DOCUMENTS

| | | | |
|---|---|---|---|
| 3,057,767 | 10/1962 | Kaplan | 416/230 |
| 3,501,090 | 3/1970 | Stoffer et al. | 416/230 |
| 3,632,460 | 1/1972 | Palfreyman | 156/173 |
| 3,670,382 | 6/1972 | Keehan | 416/22 B |
| 3,923,422 | 12/1975 | Ianniello et al. | 416/230 A |
| 3,943,020 | 3/1976 | Ashton et al. | 416/230 A |
| 4,137,354 | 1/1979 | Mayes et al. | 156/175 |
| 4,255,087 | 3/1981 | Wackerle et al. | 416/230 A |
| 4,293,276 | 10/1981 | Brogdon et al. | 416/230 A |

Primary Examiner—Willard E. Hoag
Attorney, Agent, or Firm—Edwin H. Crabtree

[57] ABSTRACT

A composite fiber reinforced propeller and a method of making the propeller using reinforced fiber. The propeller having the fiber wound along the length of the propeller blades and through the hub for strengthening the propeller so light-weight plastic material or the like can be used in the molding of the propeller.

5 Claims, 4 Drawing Figures

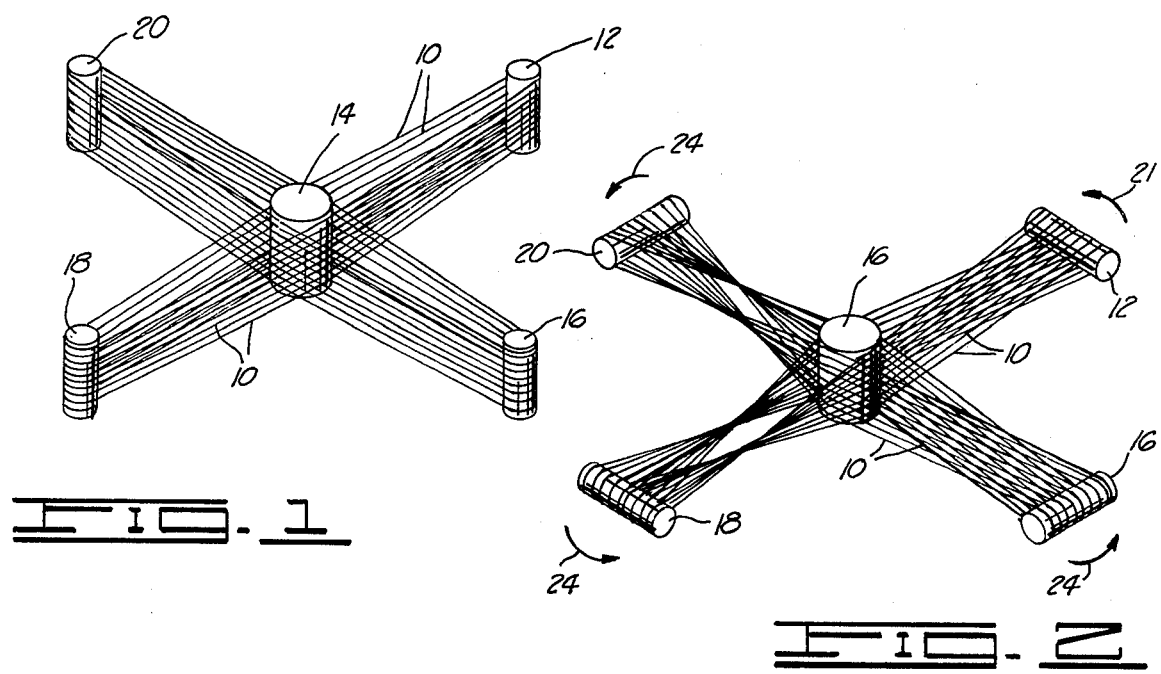
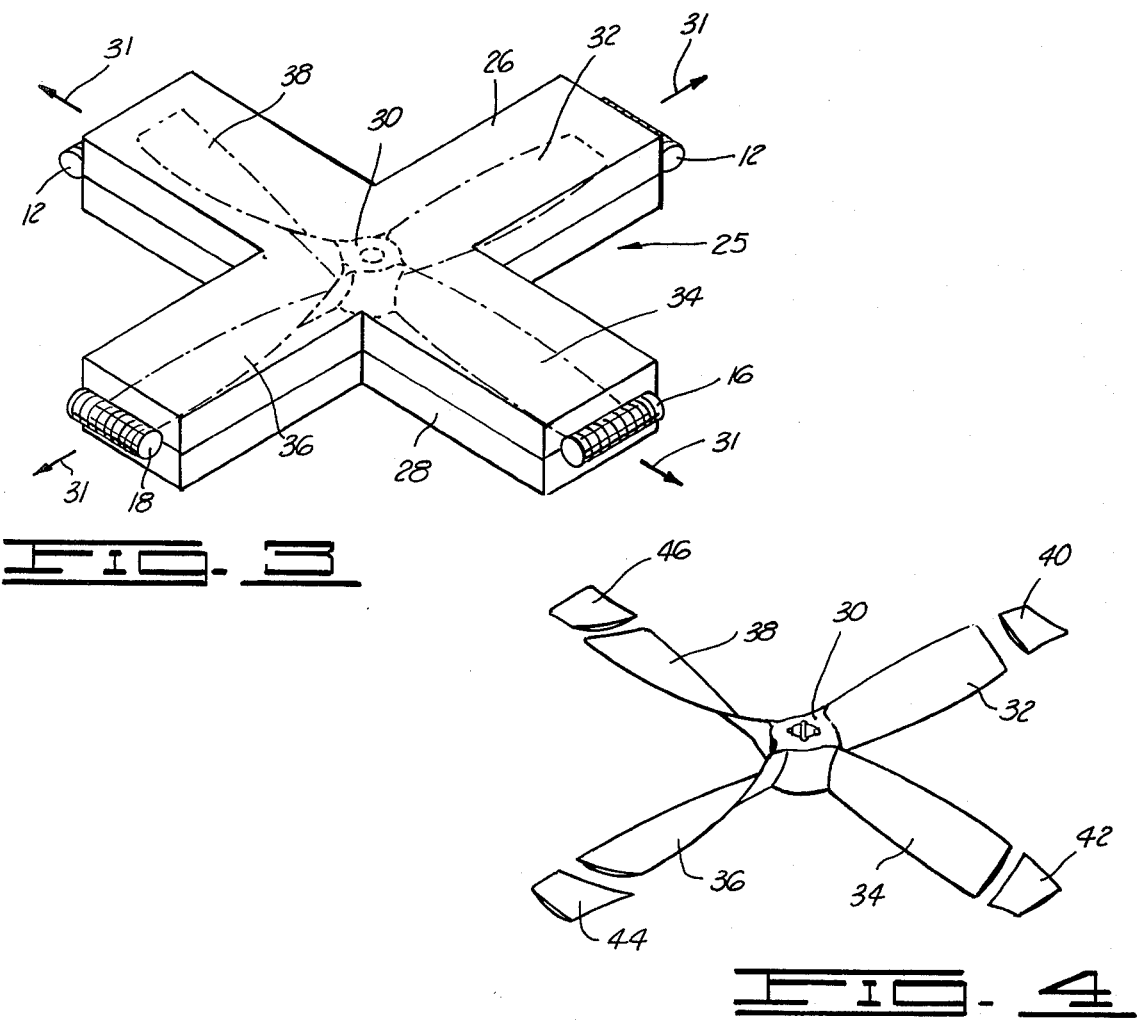

COMPOSITE FIBER REINFORCED PROPELLER

BACKGROUND OF THE INVENTION

This invention relates to a lightweight propeller and more particularly but not by way of limitation to a high-strength, lightweight propeller having a fiber reinforcing material wound internally along the length of the propeller blades and through the hub of the propeller.

Heretofore, there have been various types of lightweight inexpensive propellers molded out of plastic, aluminum and various types of synthetic materials and different types of metals. None of the prior art propellers have used a filament fiber material progressively wound along the length of a propeller balde and through the hub of the propeller for providing additional strength to the propeller so lightweight plastics, polystyrenes or different types of synthetic materials can be used to produce a propeller as described herein.

SUMMARY OF THE INVENTION

The propeller uses a chosen fiber for providing a lightweight, inexpensive propeller which presents a minimum radar cross-section when used with aircraft, autonomous missiles or the like. The propeller can also be used equally well in other type of propeller applications.

The propeller uses composite reinforcing fiber which is wound internally along the length of the propeller blades and through the hub of the propeller for the most favorable location in strength requirements. Also synthetic materials such as polystyrene and the like can be use which heretofore were not used in propeller construction.

The lightweight fiber reinforced propeller includes a hub and a plurality of blades integrally attached to the hub and extending outwardly therefrom. Fiber such as fiberglass strands, Kevlar, graphite or any other types of high strength fiber can be used which is wound internally through the blades and along the length thereof and through the hub for providing improved strength to the propeller.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates how the fiber material is wound on a central mandrel and a plurality of tip mandrels.

FIG. 2 illustrates how the tip mandrels are rotated with the fiber wound thereon so the fiber is placed in the proper blade tip angle of attack.

FIG. 3 illustrates the central mandrel and the fiber material received between an injection mold. The mold having cavities therein for forming the hub and propeller blades.

FIG. 4 illustrates the completed propeller with the tip of the blades trimmed as required.

DETAILED DESCRIPTION OF THE DRAWINGS

In FIG. 1 a reinforcing fiber 10 is wound around a first tip mandrel 12 and around a central mandrel 14. The tip mandrel is positioned beyond the tip of the propeller blade to be formed. The central mandrel 14 is positioned where the hub of the propeller is to be formed. From the central mandrel 14, the fiber 10 is wound around a second tip mandrel 16 and back again around the central mandrel 14 where it is wound therearound and back to a third tip mandrel 18. From the third tip mandrel 18, the fiber 10 is again wound around the central mandrel 14 and from there to a fourth tip mandrel 20 and received therearound and back to the central mandrel 14. The fiber 10 returns to the first tip mandrel 12 where the winding process is again repeated until sufficient fiber 10 is received around the four tip mandrels and the central mandrel for producing an improved, lightweight fiber reinforced propeller 22 shown in FIG. 4.

In FIG. 2 the mandrels 12, 16, 18 and 20 have been rotated in a counterclockwise direction as shown by arrows 24. The mandrels are rotated to a position which will provide the fiber 10 being placed in the proper blade tip angle of attack as required for the propeller 22. The fiber 10 is wound on the mandrels in a spaced relationship to each other to provide the most favorable location in the hub and blades of the propeller 22 for increased strength requirements.

In FIG. 3 the wound fiber 10 and the central mandrel 14 are received between an injection mold 25 having split halves 26 and 28. The halves 26 and 28 include cavities therein for forming a hub 30 and blades 32, 34, 36 and 38. It should be noted the mandrels 12, 16, 18 and 20 extend outwardly from the split halves 26 and 28 and are held in tension as indicated by arrows 31 so the fiber 10 is held tightly therein and properly spaced one from the other.

Injection mold material is then poured into the split halves 26 and 28 and received in and around the fiber 10 forming the blades 32, 34, 36 and 38. The central mandrel 14 can be left inside the halves 26 and 28 thus forming a part of the hub 30 or prior to this time, the central mandrel 14 can be removed after the mold material is received in the cavities forming the blades.

The mold material is allowed to cure and the propeller 22 is removed from the mold 25. The completed propeller 22 is shown in FIG. 4 with tip 40, 42, 44 and 46 of the blades 32, 34, 36 and 38 trimmed as required. While the propeller 22 is shown with four blades it can be appreciated that two, three or more blades can be integrally formed and attached to the hub 30 as described above.

Changes may be made in the construction and arrangement of the parts or elements of the embodiments as described herein without departing from the spirit or scope of the invention defined in the following claims.

What is claimed is:

1. A method of making a lightweight fiber reinforced propeller having a hub and at least two blades integrally attached to the hub and extending outwardly therefrom, the steps including:

winding a reinforcing fiber around a first blade tip mandrel. the first mandrel positioned beyond the end of the tip of the first blade to be reinforced;

winding the fiber around a portion of a circumferences of an annular shaped central mandrel, the central mandrel positioned where the propeller hub is to be formed;

winding the fiber around a second blade tip mandrel, the second mandrel positioned beyond the end of the tip of the second blade to be reinforced;

repeating the above three steps until sufficient fiber is received on the mandrels for the required strength of the propeller;

placing the reinforcing fiber and the central mandrel between split halves of an injection mold, the mold having cavities therein for forming the propeller hub and blades;

pouring the injection molding material into the mold for forming the propeller therein and curing the injection molding material and removing the fiber reinforced propeller therefrom during said winding steps said first and second mandrels being substantially parallel to said central mandrel and during said placing step rotating said first and second mandrels so as to be substantially perpendicular to said central mandrel.

2. The method as described in claim 1 further including the step of trimming the tips of the propeller blades after removing the fiber reinforced propeller from the mold.

3. The method as described in claim 1 further including the step of rotating the first and second mandrel with the fiber wound thereon to the proper blade tip angle of attack prior to placing the fiber and the central mandrel between the split halves of the injection mold.

4. The method as described in claim 1 further including the step of removing the central mandrel from the injection mold after the injection mold material has been poured in the blade cavities of the mold and prior to forming the hub of the propeller.

5. A method of making a lightweight fiber reinforced propeller having a hub and at least two blades integrally attached to the hub and extending outwardly therefrom, the steps including:

winding a reinforcing fiber around a first balde tip mandrel, the first mandrel positioned beyond the end of the tip of the first blade to be reinforced;

winding the fiber around a portion of a circumference of an annular shaped central mandrel, the central mandrel positioned where the propeller hub is to be formed;

winding the fiber around a second blade tip mandrel, the second mandrel positioned beyond the end of the tip of the second blade to be reinforced;

repeating the above three steps until sufficient fiber is received in a spaced relationship from each other on the mandrels for providing the required strength of the propeller;

rotating the first and second mandrels so the fiber is placed in the proper blade tip angle of attack;

placing the reinforcing fiber and central mandrel between split halves of an injection old, the mold having cavities therein for forming the propeller hub and the blades;

pouring the injection molding material into the mold for forming the propeller therein and curing the injection molding material and removing the fiber reinforced propeller therefrom; during said winding steps said first and second mandrels being substantially parallel to said central mandrel and the fibers being placed in the mold at said proper angle.

* * * * *